Figure 1:
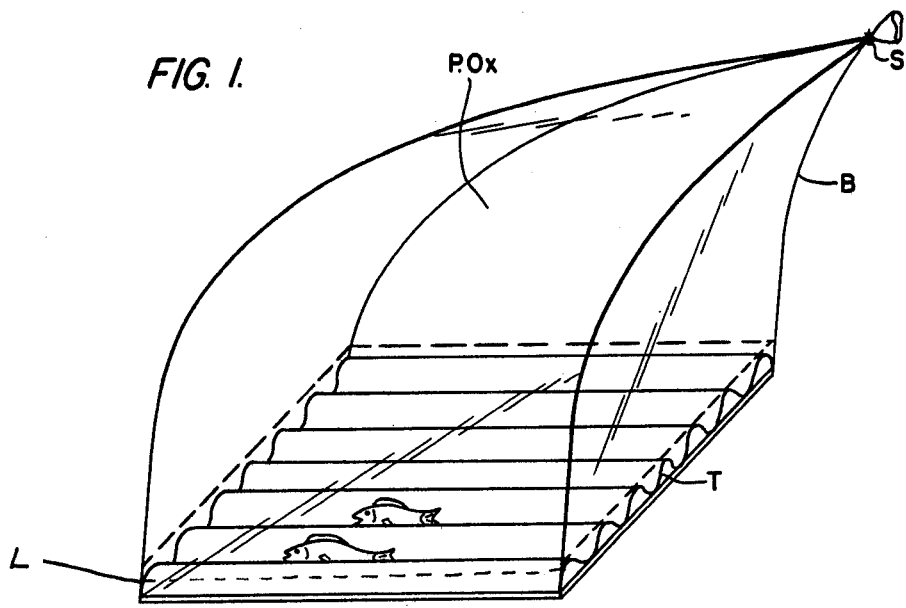

United States Patent [19]

Knowles

[11] 4,455,966
[45] Jun. 26, 1984

[54] METHOD OF AND APPARATUS FOR HOLDING LIVE FISH AND THE LIKE

[75] Inventor: Albert H. Knowles, Moniack Bridge by Kirkhill, Scotland

[73] Assignee: K.R. Associates, Inc., Concord, N.H.

[21] Appl. No.: 373,151

[22] Filed: Apr. 29, 1982

Related U.S. Application Data

[63] Continuation-in-part of Ser. No. 149,253, May 12, 1980, abandoned.

[51] Int. Cl.³ .............................................. A01K 63/02
[52] U.S. Cl. ................................................... 119/3
[58] Field of Search ............................. 119/2, 3, 4, 5

[56] References Cited

U.S. PATENT DOCUMENTS

| 884,140 | 4/1908 | Erlwein et al. | 119/5 |
|---|---|---|---|
| 2,091,695 | 8/1937 | Thuma | 119/5 |
| 2,680,424 | 6/1954 | Brown | 119/3 |
| 2,949,882 | 8/1960 | Thomas, Jr. | 119/3 |
| 3,076,432 | 2/1963 | Jung et al. | 119/3 |
| 4,089,298 | 5/1978 | Wilson | 119/2 |

Primary Examiner—Hugh R. Chamblee
Attorney, Agent, or Firm—Rines and Rines, Shapiro and Shapiro

[57] ABSTRACT

This disclosure is concerned with the very shallow-water holding the live fish on flat trays in a dry oxygen-saturated atmosphere to obviate the requirement of large volumes of water, and special compartments, especially, though not only, in transport applications.

8 Claims, 2 Drawing Figures

U.S. Patent     Jun. 26, 1984     4,455,966

METHOD OF AND APPARATUS FOR HOLDING LIVE FISH AND THE LIKE

This application is a continuation-in-part of copending U.S. application Ser. No. 149,253, filed May 12, 1980, now abandoned.

The present invention relates to the holding of live fish, such as salmonoids and the like (though the term "fish" is herein used in a more generic sense, including a wide variety of fish species and also crustacea exhibiting similar life-support requirements), being more particularly directed to obviating the requirement for large volumes of water in any of storage, temporary holding, and transportation applications.

Underlying the invention is the discovery that it is not necessary to employ large tanks and volumes of water, often oxygenated as during tank transport, to keep massive quantities of fish alive and well. In the area of transportation, the weight of such large water volumes is generally many times that of the fish, and is thus costly and bulky at best. Similar remarks apply to other fish-holding needs, including temporary or more permanent storage.

While it has previously been proposed, as in U.S. Letters Patent 2,689,424, to try to preserve and transport fish in individual shallow water trays, one to a fish, with the aid of a moisture-laden air atmosphere above the water layer in the tray, such a structure is clearly not adapted to the transport of large numbers of unconfined fish and is severely limited in time of effective use, by the oxygen limitation in the moisturized atmosphere above the water level. In such a system, the moisture provides the only oxygen through the gills for the life-support of the fish, once the oxygen present in the thin water layers has been consumed. In accordance with the present invention, reliance is not placed upon the gills utilizing oxygen-laden moisture above the water layer. To the contrary, it has been discovered that through keeping the medium above a thin water layer free of moisture by using substantially a super-saturated oxygen atmosphere throughout that medium in dry state, and by unconfining the fish so that there are many fish, side-by-side in a single thin water layer on the resting surface, the agitation by the fish themselves will continually insure the mixing of the oxygen from the medium above the water layer into the water layer, continually mixing in or replenishing oxygen therein. This has been found to enable the fish to derive that oxygen through the dampening of the gills by the water of the layer alone—the continual agitation as well as the adjacent agitation of the multiplicity of fish in the same water layer insuring the continual mixing and supply of oxygen in the thin water layer. Under such circumstances, as later explained, it has been discovered that an almost indefinite life-support system is provided.

Conditions found essential to practice the invention involve maintaining the fish laterally spread out over preferably a substantially flat area, but preferably substantially side-by-side and end-to-end, touching or almost touching, under circumstances where their gills are susceptible to continual wetting (with fresh water, for example, in the case of small salmonoids), and with the flat area sealed within a dry oxygen-saturated atmosphere. Under this set of conditions, it has been discovered that the level of water in which the fish rest upon the flat area can be very low; indeed, being adjustable from only a substantial fraction of the height of the fish to a value corresponding to the height or somewhat greater—a range herein defined as substantially "comparable" to such height. This condition, it has been found, startlingly allows the fish continuously to absorb oxygen and thrive without being immersed in and released for swimming about a larger water volume since the fish, in their continual movement and agitation, keep splashing the thin water layer and thereby mixing the oxygen of the supersaturated atmosphere into the water. With such a packed array of side-by-side fish, nearly every region of the thin water layer is in continual mixing turmoil as the fish move, insuring uniform and continual oxygen replenishment in the water. The fish are automatically restrained from substantial vertical movement and are confined to resting and turning on the planar area in an entirely adequate life support system.

An object of the invention, therefore, is to provide a new and improved live fish holding method (or process) and apparatus that obviates the disadvantages of large water tank volumes.

A further object is to provide a novel fish-holding technique of more general applicability as well.

Other and further objects will be explained hereinafter and are more particularly delineated in the appended claims.

In summary, from one of its important aspects, the invention embraces a method of holding live fish, that comprises, resting the fish side-by-side on a substantially flat surface, enveloping the surface within an oxygen-saturated atmosphere, and introducing a shallow water layer upon the surface sufficient only to maintain the fish gills continuously damp as the fish change position to permit life-supporting utilization of the oxygen, (the layer of water for most economic purposes being of height only substantially comparable to the height of the fish). Preferred embodiments and best mode of operation are hereinafter presented.

Figure 2:
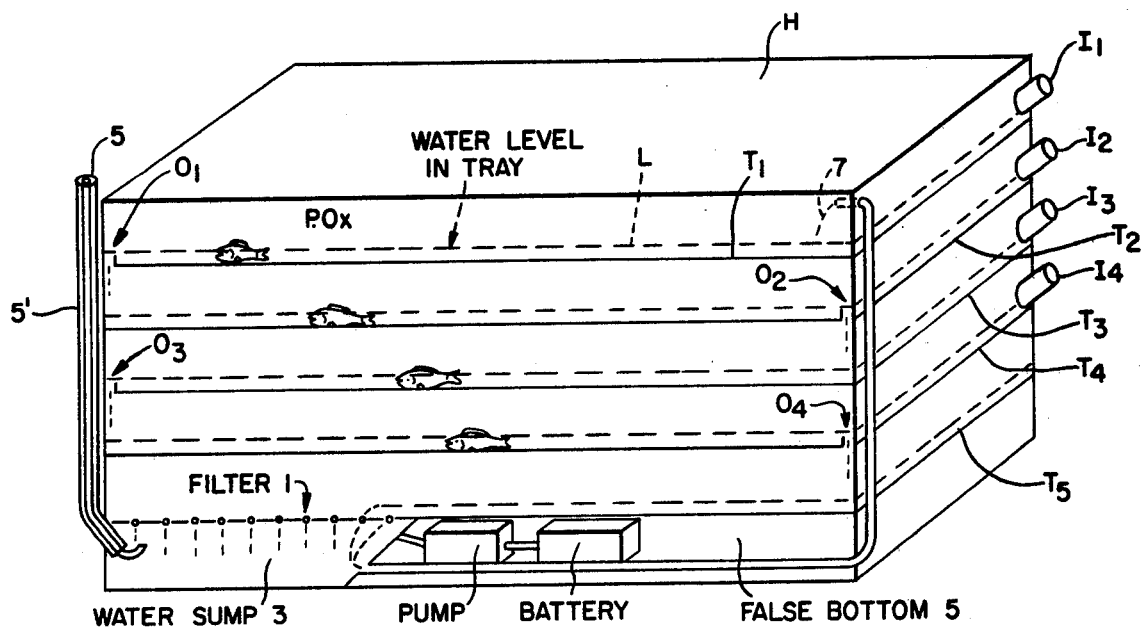

The invention will now be described with reference to the accompanying drawings, FIG. 1 of which is an isometric view of a simple carrying apparatus employing the discovery of the invention; and FIG. 2 is a partially isometric view of a preferred apparatus for practicing the process underlying the invention on a larger scale.

Referring to FIG. 1, a very simple carrying apparatus is illustrated demonstrating the underlying discovery and method of the invention, and useful for hand-carrying a small quantity of small fish such as salmonoid fry or parr or the like. The fish are shown resting substantially side-by-side and end-to-end in corrugations or ridges of a substantially flat or planar tray T covered by a very shallow water layer L, barely covering the fish and sufficient only to maintain the gills continuously damp, disposed within an enveloping transparent plastic bag housing B, as of polyethelene or the like, into which pressurized oxygen "P.Ox." has been introduced, with the bag sealed at S. The term substantially "flat" as used herein is intended to embrace somewhat curved surfaces as well.

This simple apparatus satisfies the before-mentioned conditions for the practice of the invention, confining the fish along the substantially planar tray T, keeping the gills continuously moist, with the fish able to roll, splash or otherwise change position in the shallow water layer, and in contact with the dry oxygen-saturated atmosphere within the housing B that sustains life support as the fish keep, in effect, pumping oxygen into the thin water layer as they agitate and, of course, utilize the oxygen mixed into the water. The use of the illustrated corrugations or ridges helps keep the fish upright and keep them distributed substantially side-by-side and end-to-end over the flat surface of the planar tray; though a totally smooth top surface of the flat tray has also been found to work as a result of the fish inherently spreading themselves out and slightly separate from one another over the surface.

The presence of a multiplicity of fish in the same very shallow water layer insures sufficient continual position changing and movement of the fish continually to replenish oxygen from the relatively dry oxygen saturated atmosphere within the housing; the oxygen being continually forced into the shallow water layer by the agitation of the fish, so that the moisture from that layer taken up by the gills is always supplied with life-support oxygen.

The difference in weight and ease for so hand-transporting fish with such a small quantity of water (generally weighing less than the fish), as compared with the use of water tanks, is impressive. As an example, 16 ounces of salmon parr have been successfully so transported in a period of over 24 hours in less than a half a pint of water—the water layer barely covering the fish; and this, as contrasted with the normal technique of transporting a gallon of water for each pound of fish. In other similar tests for determining the water level in contact with the oxygen saturated atmosphere above the planar tray that is actually needed, 3 gram salmon parr (6 to 7 cm. in length) were successfully held for half a day on a 6-inch tray in the apparatus of FIG. 1 with only 100 milliliters of water, which extended only about one-quarter the height of the fish. The fish were in excellent condition at the end of the test, which included both transportation and stationary holding.

It has been found preferable to avoid fish body waste contamination effects, in view of the shallow water levels employed in accordance with the invention, by withholding food from the fish for about two days before introduction into the holding apparatus.

In FIG. 2, a larger apparatus is illustrated comprising a plurality of flat trays $T_1$, $T_2$, $T_3$, $T_4$, $T_5$, etc. constructed in vertically stacked spaced relationship within a closed housing H. The right-most corners of the tray sections are shown provided with respective inlet pipes $I_1$, $I_2$, $I_3$, $I_4$, etc. for loading and unloading fish, such as the before mentioned salmon fry, parr or smolt or the like, which, as another example, are to be transported to a sea-side growing site from a hatchery. Clearly other types of fish may also be so transported; or the housing H may be a more permanent holding station, as desired.

The uppermost tray $T_1$ has a left-hand opening $O_1$ communicating water flow with the next lower tray section $T_2$; and the third tray $T_3$ similarly communicates at a left-hand opening $O_3$ with its next lower tray section $T_4$. Each of trays $T_2$ and $T_4$, on the other hand, has opposite end (right-hand) openings $O_2$ and $O_4$ respectively communicating water flow with the tray sections $T_3$ and $T_5$. The tray $T_5$ has a perforated filter 1 therein at its left-hand section, communicating with a water-sump section 3 disposed therebelow and to the left of a false bottom section 5 containing a battery or other powered waterpump, so-labelled, communicating with the sump for purposes later explained.

In operation, the tray sections are individually filled (as by a funnel at the inlets $I_1$–$I_4$), with water carrying the desired number of fish for each tray. As before stated, the trays may have ridges or be perfectly flat. The filling continues for each successive tray section, with the inlets then being sealed off by, for example, screw-threaded gas-tight caps (not shown). With the housing H thus completely filled with water and the individual tray sections each containing the desired number of fish, the sump 3 will be filled as a result of flow communication through the filter screen 1, in the bottom tray section $T_5$. Oxygen under slight pressure (say $1\frac{1}{2}$ atmosphere or greater) is then introduced into the inner tube 5 within an overflow pipe 5' and bubbles upward through the water in the sump 3, through the perforations in the filter screen 1 and through the communicating openings $O_1$–$O_4$ to the inner top region of the housing H at the top of the uppermost tray section $T_1$. As the oxygen builds up, it forces water up the overflow pipe 5'. The dashed lines schematically show the subsequent pumping of the sump water into the top tray at 7 and then through the successive tray openings $O_1$–$O_4$ at successively opposite ends of the successive trays $T_1$–$T_4$, with water flowing in opposite directions along successive trays. The oxygen inlet tube 5 is then removed and the overflow pipe 5' is closed at the top with, for example, a gas-tight screw cap. The oxygen in the housing H is now dry and trapped under slight pressure depending upon the level of water up the overflow pipe 5'. The pump then either continuously or at periodic intervals maintains the sump volume to correspond to the water level required to cover or partly cover the fish resting on each of the planar trays $T_1$–$T_4$, and in contact with the enveloping oxygen saturated atmosphere. The water is thus circulated over the trays at the desired shallow levels.

After the fish have been held and/or transported as desired, they are readily removed by uncapping the inlets $I_1$–$I_4$, tipping the housing H and, by virtue of this construction, readily guiding the fish to the right-hand corner for emptying. The housing H, of course, can be carried by a vehicle small compared to the tank trucks required by the present-day techniques.

The only way, however, to insure reliable pumping action at all times and over the whole tray for mixing the oxygen of the super-saturated atmosphere into the water layer for continual oxygen replenishment is to have a large number of contiguous "pumps"—i.e. a large number of fish packed substantially side-by-side and end-to-end in the same water layer able to communicate their disturbances to adjacent regions of the water layer. This may also explain why, as before stated, a thinner layer extending only one-quarter the height of the fish can be used, still with the insurance that there will always be enough oxygen forced to be absorbed into the water layer for life-support.

As a further example of the unusual holding capacity and novel oxygen-mixing technique of the invention, it has been found that salmon fry can be placed side-by-side and almost end-to-end on a planar tray (slightly longitudinally ridged or even flat) with a water layer as before described only a quarter or half the height of the fish—permitting, for example, four one-inch fry per square inch of tray.

Further modifications will also occur to those skilled in this art, and such are considered to fall within the spirit and scope of the invention as defined in the appended claims.

What is claimed is:

1. A method of holding a multiplicity of live fish, that comprises, resting the fish on a substantially flat tray surface in substantially side-by-side relationship, enveloping the surface with a dry oxygen-saturated atmosphere, and introducing a single shallow water layer upon the tray surface and of depth sufficient only to maintain the fish gills continuously damp, a multiplicity of the fish being positioned in said single shallow water layer retained by sidewalls of the tray so that movement of the multiplicity of live fish provides sufficient agitation of the water layer continually to mix oxygen into the shallow layer and thereby provide life-supporting utilization of the oxygen.

2. A method as claimed in claim 1 and in which the layer of water is adjusted to a level substantially comparable to the height of the fish.

3. A method as claimed in claim 2 and in which said level is a fraction of said height.

4. A method as claimed in claim 1 and in which the shallow water layer is changed from time to time to freshen the same and prevent excretion poisoning and the like.

5. A method as claimed in claim 1 and in which feed is withheld from the fish before introduction onto the surface to eliminate body waste contamination.

6. A method as claimed in claim 1 and in which the weight of held fish is materially greater than that of the water.

7. A method as claimed in claim 1 and in which the substantially flat surface is provided with ridges to allow upright positioning of the fish.

8. A method as claimed in claim 1 and in which said flat surface is stacked in spaced relation upon one or more similar oxygen-enveloped surfaces.

* * * * *